May 1, 1962 D. M. KING 3,032,173
DRIVE UNITS FOR CONVEYOR SYSTEMS
Filed July 23, 1959 7 Sheets-Sheet 1

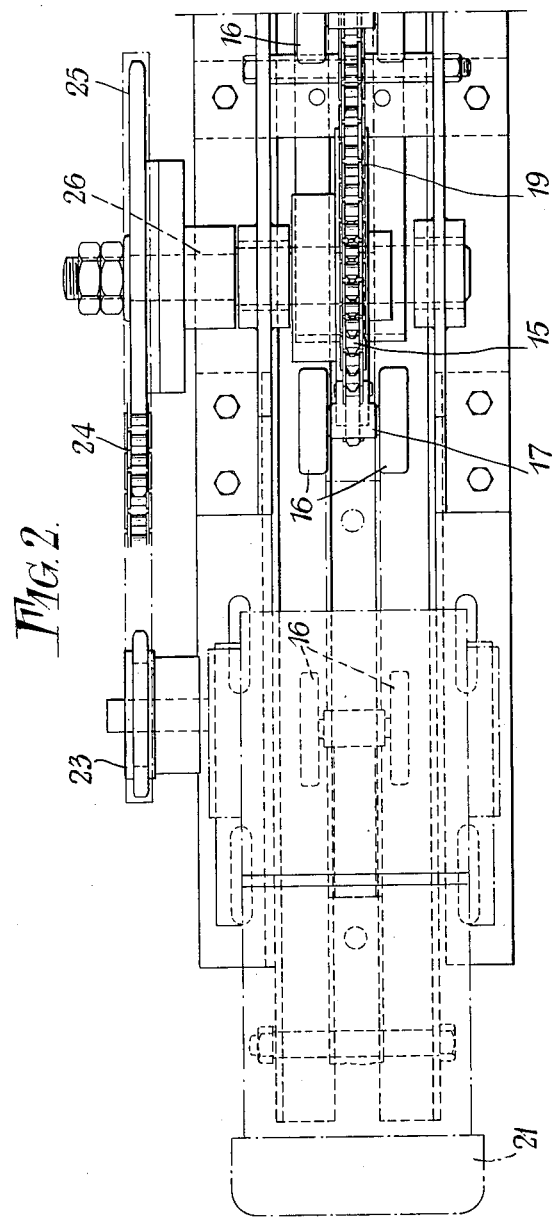

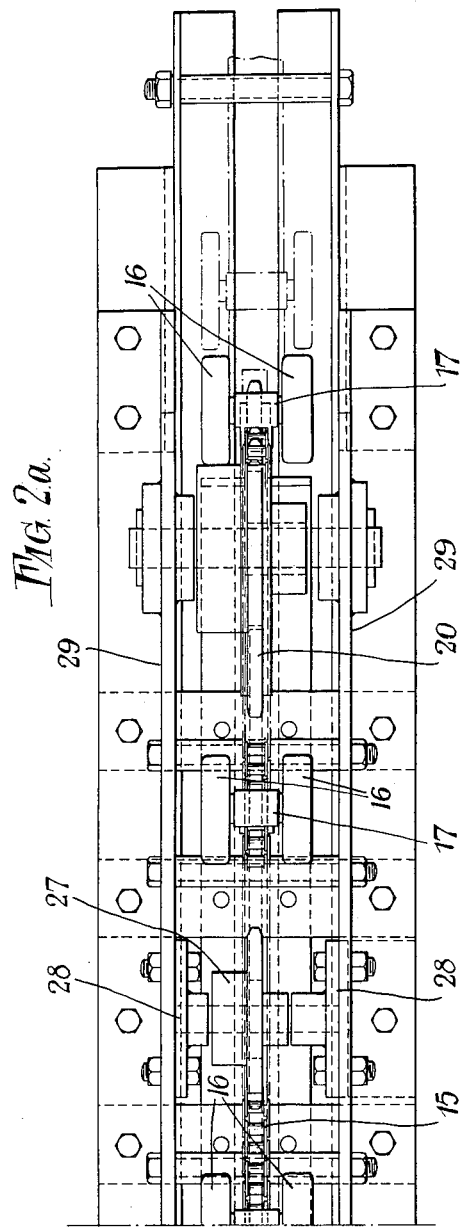

United States Patent Office 3,032,173
Patented May 1, 1962

3,032,173
DRIVE UNITS FOR CONVEYOR SYSTEMS
Donald Mayer King, Argyle Works, Stevenage, England
Filed July 23, 1959, Ser. No. 829,001
Claims priority, application Great Britain July 29, 1958
3 Claims. (Cl. 198—203)

This invention relates to drive units adapted to be applied to a conveyor system of the kind incorporating an endless chain which is required to be driven and which incorporates wheels or rollers spaced along the length thereof.

According to the invention a drive unit for application to a conveyor system of the kind referred to comprises a prime mover and an endless chain adapted to be driven by said prime mover and having at spaced points along its length freely rotatable wheels or rollers, said chain being adapted to be so arranged in relation to the conveyor chain that when a drive is imparted thereto the wheels or rollers thereon will engage the wheels or rollers on the conveyor chain and will thus cause a drive to be imparted to the latter. Preferably the wheels or rollers on the endless drive chain will be disposed in pairs each pair being supported for free rotation in bracket means which are affixed to or incorporated in said chain and project outwardly therefrom.

Figure 1:
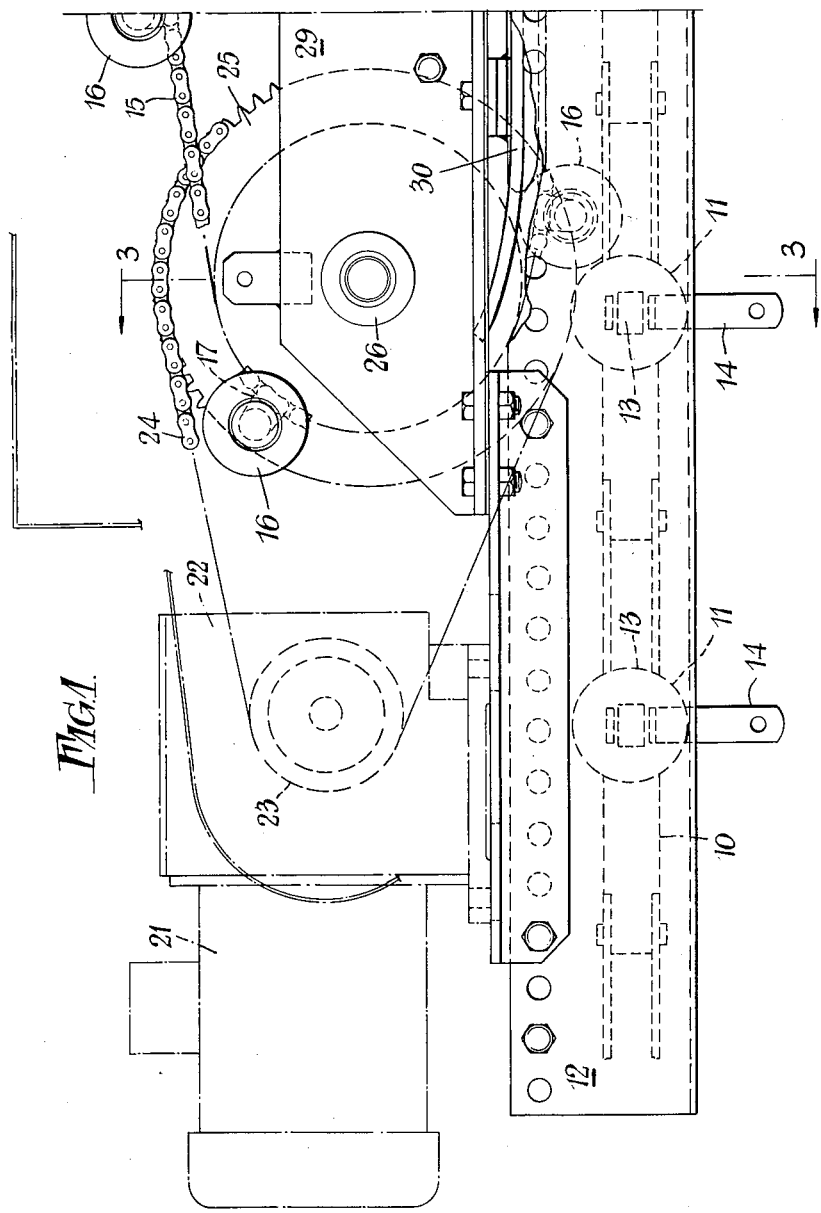
Figure 1A:
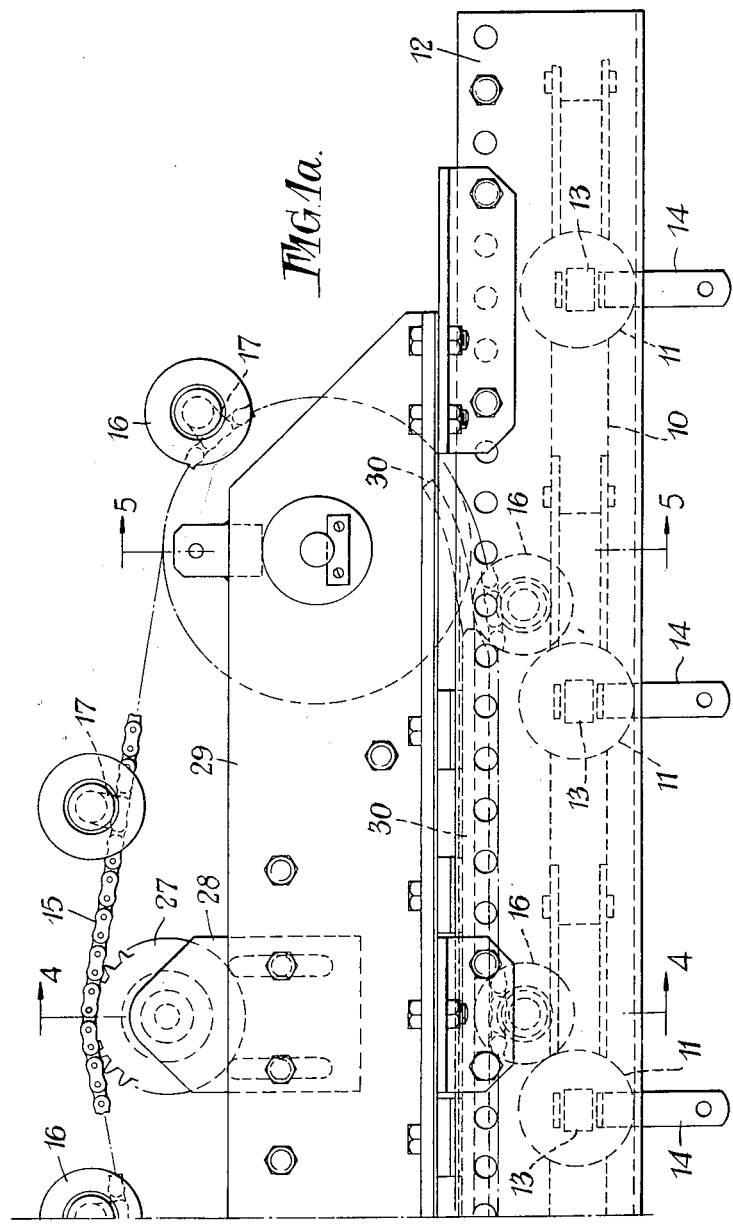
Figure 3:
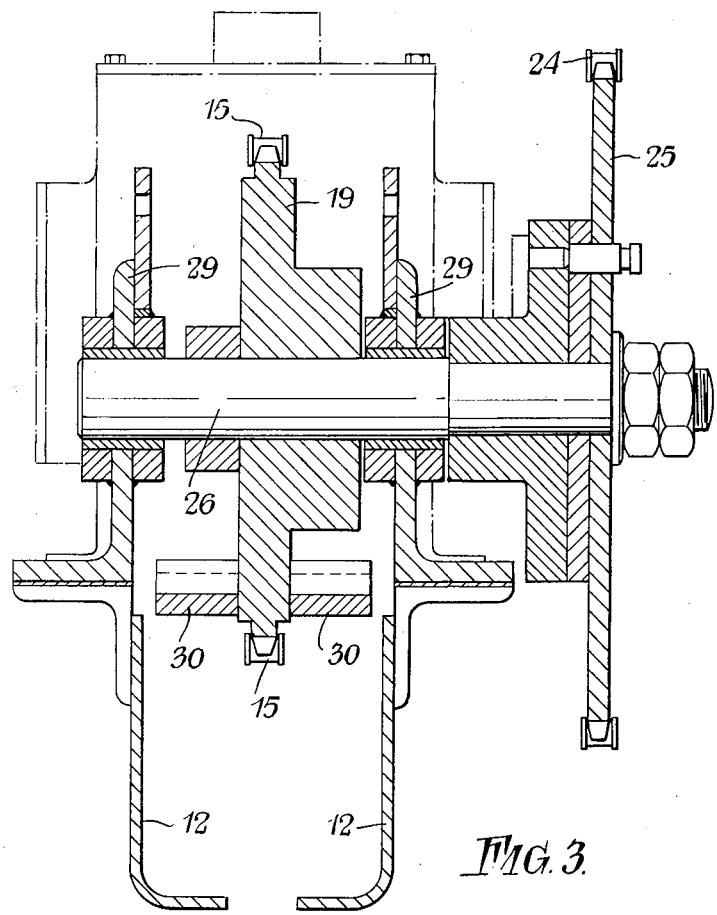
Figure 4:
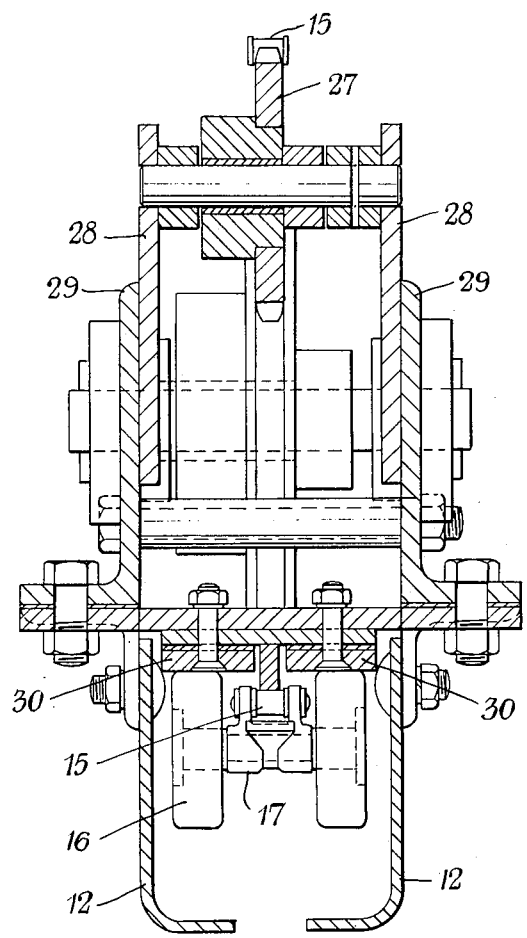
Figure 5:
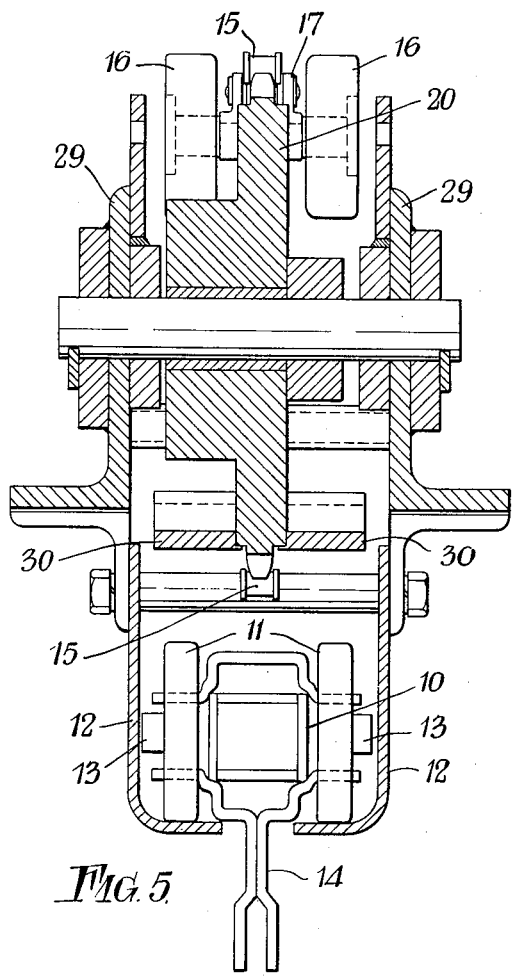
Figure 6:
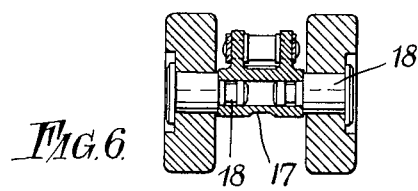

In order that the said invention may be clearly understood and readily carried into effect the same will be hereinafter more fully described with reference to the accompanying drawings in which:

FIGURES 1 and 1a together constitute a side elevational view of a drive unit,

FIGURES 2 and 2a together constitute a plan view of the unit shown in FIGURES 1 and 1a, FIGURE 3 is a sectional view on the line 3—3 of FIGURE 1 the conveyor chain being however omitted, FIGURE 4 is a sectional view on the line 4—4 of FIGURE 1a the conveyor chain being again omitted, FIGURE 5 is a sectional view on the line 5—5 of FIGURE 1a, FIGURE 6 shows a detail of construction.

Referring now to the drawing it will be seen that the conveyor system to which the drive unit is applied comprises an endless chain 10 made up of a succession of substantially U shaped links interconnected by connecting pins. The chain is in known manner provided at spaced points along its length with roller assemblies each consisting of a pair of freely rotatable rollers 11 adapted to engage and run on the base of a channel section track 12 thereby to provide rolling support for the chain and a pair of freely rotatable laterally projecting rollers 13 adapted to cooperate with the side walls of the track 12 thereby to provide lateral guide means for the chain. Incorporated in each roller assembly is a depending clevis attachment 14 to which a load bar or other equivalent load supporting device may be attached. Such a conveyor system as outlined above is generally well known and will not be further described herein.

Disposed at a convenient point along the path of such a conveyor is a drive unit such unit comprising an endless chain 15 hereinafter termed the drive chain which is of relatively light construction. The drive chain 15 is provided at spaced points along its length with pairs of freely rotatable wheels or rollers 16. As will be seen the chain 15 is provided at spaced points along its length with brackets or supports 17 each adapted, as will be seen clearly from FIGURE 6, to support a pair of stub axles 18 on which the wheels or rollers 16 are rotatably mounted. The spacing of the wheels or rollers 16 is related to the spacing between the rollers 11 on the conveyor chain 10 so that in the region of the drive unit each pair of rollers 11 will on operation of the drive chain be engaged by a pair of wheels or rollers 16 on said drive chain. As will be seen the drive chain 15 is caused to run in a closed loop or circuit around terminal wheel sprockets 19 and 20, the sprocket 19 being adapted to be driven from an electric motor 21 via a gear box 22, a sprocket 23, chain 24 and sprocket 25 which latter is fixedly mounted on a shaft 26 carrying the sprocket 19. 27 denotes a freely rotatable sprocket wheel which is carried by a pair of brackets or the like 28 which are so mounted on the side plates 29 (which support the shafts carrying the sprockets 19 and 20) as to be adjustable thereby to allow for maintenance of the required tension on the drive chain 15. As will be seen from the drawings the drive chain 15 is so arranged in relation to the conveyor chain 10 that one flight thereof hereinafter termed the operative flight will be spaced above and will travel along a path parallel to a selected section of said chain 10 the spacing being such that as each pair of wheels or rollers 16 on said drive chain 15 enters and travels along the operative flight it will engage a pair of rollers 11 on the conveyor chain 10 and will thus impart a rotational movement to the latter and a drive to said conveyor chain. In order to maintain the operative flight of the drive chain 15 in the required position a pair of fixed guides 30 will be provided with which latter the wheels or rollers 16 will cooperate.

If desired instead of the arrangement above described each bracket or support 17 on the drive chain 15 may be so formed as to carry two pairs of rollers, the pairs being sufficiently spaced apart so that when in the operative flight of the drive chain the two pairs will together engage a pair of rollers 11 on the conveyor chain 10.

Further if desired the wheels or rollers 16 on the drive chain 15 may each be formed with a radially directed flange so that as each pair of such wheels or rollers engages a pair of rollers 11 on the conveyor chain the latter will be accommodated between the aforesaid flanges thereby to prevent any possibility of undesired relative lateral movement between the respective chain. It will of course be obvious that the spacing or pitch of the brackets or supports 17 on the drive chain 15 will, irrespective of whether each carries one or two pairs of wheels or rollers, have to correspond or be related to the spacing between the pairs of wheels or rollers on the conveyor chain in order to ensure appropriate interengagement of the respective sets of wheels or rollers.

It will be appreciated that the drive unit comprising the drive chain 15 and the drive mechanism therefor can be constructed and arranged as a compact unit which is capable of application to any conveyor, being adapted to be bolted or otherwise readily secured as a unit to the supporting structure of such conveyor.

It is to be understood that a drive unit of the kind above described is not necessarily limited in its application to a conveyor system of the kind incorporating a chain of the type above described since it may be employed to drive any chain which incorporates wheels or rollers spaced along the length thereof, such wheels or rollers not necessarily serving to provide rolling support for the chain. For example the conveyor chain might incorporate pairs of rollers at least portions of the peripheries of which project above, below or laterally of such chain in which case the drive unit will be arranged above, below or to the appropriate side of said chain.

I claim:

1. A conveyor system comprising a first endless conveyor chain, a second endless conveyor chain adjacent the first chain and having a portion of travel thereof which is parallel to a corresponding portion of the first chain, a plurality of freely rotatable wheels coupled in spaced relation to said first endless chain, a track substantially parallel to said portions, said wheels being supported on said track and being adapted to roll thereon, a plurality of freely rotatable rollers coupled in spaced relation to said second chain in a complementary relationship to said wheels, a fixed guide extending parallel to said track and in spaced relation therewith, said second chain and rollers being in operative position with respect to said guide so that said rollers are in rolling engagement with the latter, said rollers and wheels each having determinable diameters, the sum of the diameter of the wheel and roller exceeding the spacing between the guide and track, said wheels and complementary rollers being in contact for rolling friction engagement with said first and second chain in parallel relation, said second chain driving the first chain with said rollers and wheels in contact, said track and guide preventing relative outward displacement of said wheels and rollers.

2. The conveyor system as claimed in claim 1, including adjustable tensioning means associated with said second chain for maintenance of a predetermined tension thereof.

3. A conveyor system comprising a first endless conveyor chain, a second endless conveyor chain adjacent the first chain and having a portion of travel thereof which is parallel to a corresponding portion of the first chain, a plurality of freely rotatable wheels coupled in spaced relation to said first endless chain, a track substantially parallel to said portions, said wheels being supported on said track and being adapted to roll thereon, a plurality of freely rotatable rollers coupled in spaced relation to said second chain in a complementary relationship to said wheels, a fixed guide extending parallel to said track and in spaced relation therewith, said second chain and rollers being in operative position with respect to said guide so that said rollers are in rolling engagement with the latter, said rollers and wheels each having determinable diameters, the sum of the diameter of the wheel and roller exceeding the spacing between the guide and track, said wheels and complementary rollers being in rolling engagement with the track and guide respectively and said wheels and complementary rollers being in rolling frictional engagement with one another with said second endless conveyor chain parallel to the corresponding portion of the first chain whereupon said second chain drives the first chain.

References Cited in the file of this patent

UNITED STATES PATENTS

| | | |
|---|---|---|
| 1,556,724 | Shaffer | Oct. 13, 1925 |
| 2,309,587 | Hassler | Jan. 26, 1943 |
| 2,371,624 | Hudson | Mar. 20, 1945 |
| 2,679,810 | Schutt | June 1, 1954 |

FOREIGN PATENTS

| | | |
|---|---|---|
| 868,751 | Germany | Feb. 26, 1953 |